United States Patent
Stager et al.

(10) Patent No.: US 9,668,149 B1
(45) Date of Patent: May 30, 2017

(54) RECEIVER STOMP-AND-RESTART IN A DISTRIBUTED MU-MIMO SYSTEM USING RSSI SEPARATION

(71) Applicant: Cisco Technology, Inc., San Jose, CA (US)

(72) Inventors: Paul J. Stager, Akron, OH (US); Matthew A. Silverman, Shaker Heights, OH (US); Brian D. Hart, Sunnyvale, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/163,915

(22) Filed: May 25, 2016

(51) Int. Cl.
| | |
|---|---|
| H04B 7/10 | (2006.01) |
| H04W 24/02 | (2009.01) |
| H04W 74/08 | (2009.01) |
| H04L 12/26 | (2006.01) |
| H04L 25/03 | (2006.01) |
| H04B 7/0452 | (2017.01) |

(52) U.S. Cl.
CPC .......... *H04W 24/02* (2013.01); *H04B 7/0452* (2013.01); *H04L 25/03* (2013.01); *H04L 43/16* (2013.01); *H04W 74/0816* (2013.01)

(58) Field of Classification Search
CPC ........ H04L 1/06; H04L 27/2647; H04B 1/123
USPC .......... 375/347, 349; 370/221, 328, 334, 350
See application file for complete search history.

(56) References Cited

U.S. PATENT DOCUMENTS

| | | |
|---|---|---|
| 5,425,000 A | 6/1995 | Reed et al. |
| 7,522,669 B2 | 4/2009 | Husted et al. |
| 7,945,005 B2 | 5/2011 | Le Saux et al. |
| 8,391,374 B2 | 3/2013 | Husted et al. |
| 8,676,144 B2 | 3/2014 | Guo et al. |
| 8,842,606 B2 | 9/2014 | Denteneer et al. |
| 8,885,453 B2 | 11/2014 | Stager |
| 9,241,275 B2 | 1/2016 | Kloper et al. |
| 2007/0230403 A1* | 10/2007 | Douglas ............... H04W 24/00 370/334 |
| 2008/0080631 A1 | 4/2008 | Forenza et al. |
| 2008/0118004 A1 | 5/2008 | Forenza et al. |
| 2008/0130790 A1 | 6/2008 | Forenza et al. |
| 2009/0067402 A1 | 3/2009 | Forenza et al. |
| 2010/0172309 A1 | 7/2010 | Forenza et al. |

(Continued)

OTHER PUBLICATIONS

Bejarano et al., "Scaling Multi-User MIMO WLANs: The Case for Concurrent Uplink Control Messages", IEEE nternational Conference on Sensing, Communication, and Networking, Jun. 22-25, 2015, 9 pages.

(Continued)

*Primary Examiner* — Khai Tran
(74) *Attorney, Agent, or Firm* — Edell, Shapiro & Finnan, LLC

(57) ABSTRACT

A system and method are provided for performing stomp-and-restart techniques in distributed MU-MIMO system. A plurality of radio head devices are provided that are configured to be deployed separated from each other in a coverage region of interest of a wireless network. A central processor subsystem is provided that is in communication with the plurality of radio head devices. The central processor subsystem configured to perform several operations based on downconverted samples received from the plurality of radio head devices.

20 Claims, 8 Drawing Sheets

(56) References Cited

U.S. PATENT DOCUMENTS

| | | |
|---|---|---|
| 2010/0316163 A1 | 12/2010 | Forenza et al. |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0044193 A1 | 2/2011 | Forenza et al. |
| 2011/0149882 A1 | 6/2011 | Gong et al. |
| 2011/0222460 A1 | 9/2011 | Fahldieck |
| 2012/0087430 A1 | 4/2012 | Forenza et al. |
| 2012/0093078 A1 | 4/2012 | Perlman et al. |
| 2012/0314570 A1 | 12/2012 | Forenza et al. |
| 2013/0034130 A1 | 2/2013 | Forenza et al. |
| 2013/0039168 A1 | 2/2013 | Forenza et al. |
| 2013/0301471 A1 | 11/2013 | Brown et al. |
| 2014/0071955 A1 | 3/2014 | Du et al. |
| 2014/0241240 A1 | 8/2014 | Kloper et al. |

OTHER PUBLICATIONS

Favalli et al., "Frequency Domain Estimation and Compensation of Intercarrier Interference in OFDM Systems", Spread Spectrum Techniques and Applications, ISSSTA '08. IEEE 10th International Symposium on, Sep. 2008 pp. 470-474, 5 pages.
Balan, et al., "AirSync: Enabling Distributed Multiuser MIMO with Full Spatial Multiplexing," IEEE/ACM Transactions on Networking, Jul. 2012, pp. 1-15.
Balan, et al., "Distributed Multiuser MIMO with Full Spatial Multiplexing," Ming Hsieh Institute, Mar. 12, 2012, pp. 1-2.
Murakami, et al., "Performance Evaluation of Distributed Multi-cell Beamforming for MU-MIMO Systems," 8th International Symposium on Wireless Communication Systems, 2011, pp. 547-551.

* cited by examiner

| CLIENT/RH | 1 | 2 | 3 | 4 | 5 | 6 | 7 | 8 |
|---|---|---|---|---|---|---|---|---|
| 1 | -45 | -70 | -40 | -50 | -80 | -80 | -90 | -90 |
| 2 | -90 | -85 | -65 | -65 | -40 | -50 | -70 | -50 |
| 3 | -70 | -90 | -65 | -45 | -70 | -50 | -55 | -70 |

FIG.3A

| CLIENT | SIGNAL-TO-INTERFERENCE RATIO OVERALL (RH) |
|---|---|
| 1 | 25 dB (RHs 1 and 3) |
| 2 | 30 dB (RH 5) |
| 3 | 20 dB (RH 7) |

RECEIVER STOMP-AND-RESTART IN A DISTRIBUTED MU-MIMO SYSTEM USING RSSI SEPARATION

TECHNICAL FIELD

The present disclosure relates to wireless communications.

BACKGROUND

In a Carrier Sense Multiple Access/Collision Avoidance (CSMA/CA) wireless communication system or network, such as an IEEE 802.11 wireless local area network, co-channel frame collisions are inevitable. To maximize throughput, the receiver of a wireless device (e.g., an access point or a client device) needs to successfully decode one of the frames in the collision.

There are techniques to maximize the probability of successfully decoding one of the frames involved in the collision. One technique is referred to as "stomp-and-restart" in which if, after a receiver has acquired a frame (start-of-packet or "SOP") and begins decoding the data, a subsequent stronger frame is received. The receiver will abort decoding the first frame and re-acquire on the second frame. If the signal strength of the second frame is much larger than that of the first frame, the second frame is likely to be successfully decoded. It is possible that the second frame is not substantially stronger than the first frame, in which case both frames are lost.

Conventional stomp-and-restart mechanisms assume collocated receiver paths (e.g., multiple-input multiple-output (MIMO)) are impacted in roughly the same way by the colliding packet; that is, all collocated receiver paths are subject to the same wideband shadow fading (one antenna is not blocked by a wall while the other antennas see a clear line-of-sight) and roughly the same path-loss (receive signal strength variations across antennas exists, but are relatively small for collocated antennas). Here, "collocated" refers to antennas spaced on the order of a wavelength, and remote receiver devices (each comprising a plurality of antennas) are spaced on the order of ten or a hundred or a thousand wavelengths.

BRIEF DESCRIPTION OF THE DRAWINGS

FIGS. 3A and 3B are diagrams illustrating examples of receive signal strength information for an example described in connection with FIG. 1, according to an example embodiment.

DESCRIPTION OF EXAMPLE EMBODIMENTS

Overview

A system and method are provided for performing stomp-and-restart techniques in distributed MU-MIMO system. A plurality of radio head ("receiver") devices are provided that are configured to be deployed separated from each other in a coverage region of interest of a wireless network. Each receiver device includes a plurality of antennas and a downconverter associated with each antenna configured to downconvert received signals transmitted by two or more client devices, each downconverter configured to produce downconverted samples of the received signals at each of the plurality of antennas. A central processor subsystem is provided that is in communication with the plurality of receiver devices. The central processor subsystem configured to perform several operations based on downconverted samples received from the plurality of receiver devices. After start-of-packet detection of a first packet by one or more of the plurality of receiver devices based on the downconverted samples, the central processor subsystem groups receiver devices into disjoint sets based on measurements related to signal strength or signal-to-interference ratio of the downconverted samples associated with the first packet. The central processor subsystem decodes the first packet using downconverted samples received by a first set of receiver devices, and determines that a stronger second packet is being received by a particular set of receiver devices while the first packet is being decoded when the stronger second packet is detected on any antenna of the particular set of receiver devices. The central processor subsystem continues to decode the first packet using downconverted samples from the first set of receiver devices but without downconverted samples from the particular set of receiver devices associated with the stronger second packet, and decodes the second packet using downconverted samples from receiver devices in the particular set of receiver devices and using downconverted samples from any one or more additional antennas of a receiver device that detected the second packet.

Example Embodiments

Figure 1:
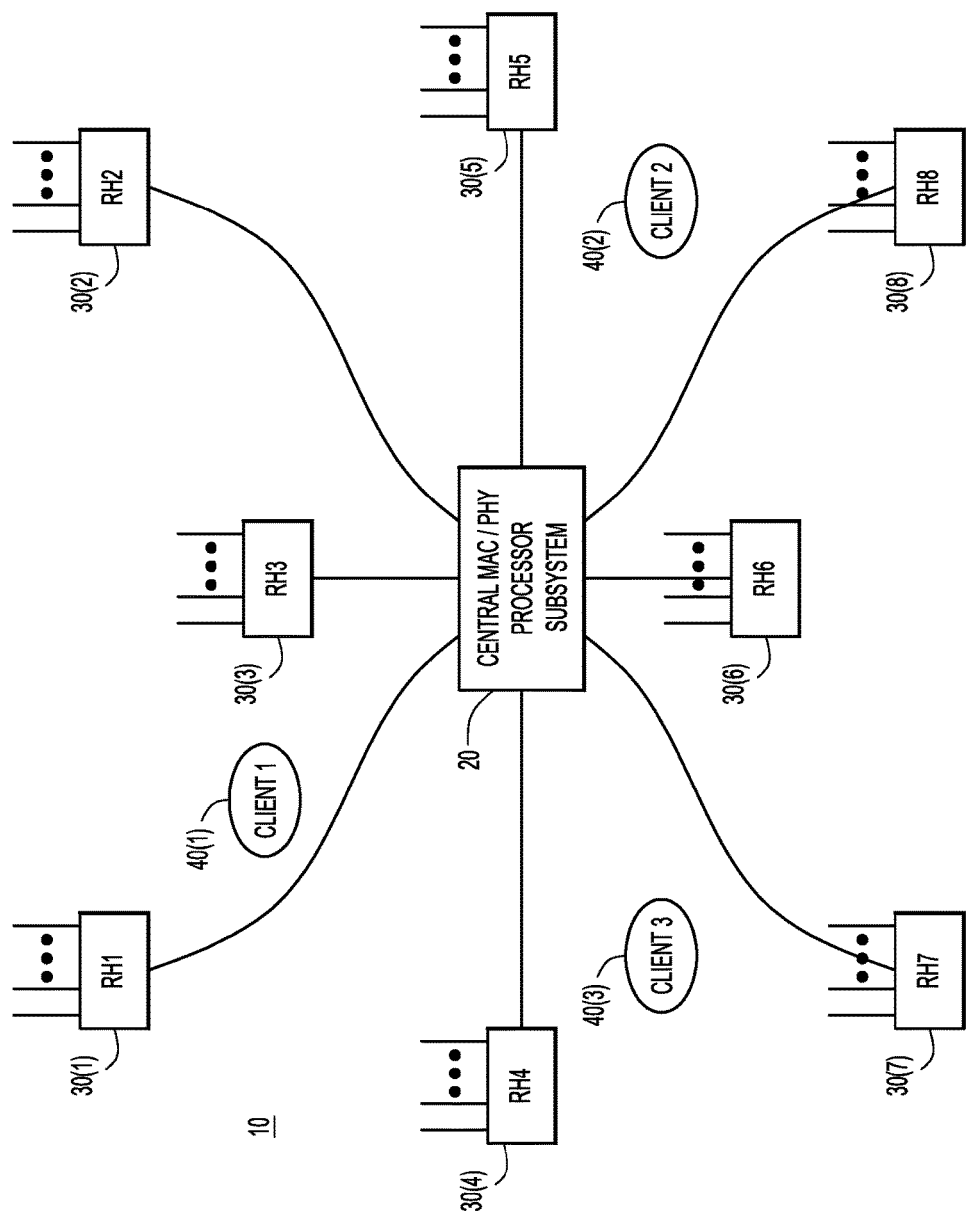
FIG. 1 is a block diagram of distributed multi-user multiple-input multiple-output (MU-MIMO) system employing stomp-and-restart techniques using receive signal strength separation, according to an example embodiment.

With reference made to FIG. 1, a wireless network system 10 is shown that includes a central media access control/PHY processor subsystem 20 connected to or in communication with a plurality of radio heads (RHs) 30(1)-30(8) physically separated from each other and arranged to wirelessly communicate with one or more wireless client devices, e.g., clients 40(1)-40(3). The RHs are also referred to herein as "receiver devices" though it is to be understood that they may also have transmit capabilities. While FIG. 1 shows 8 RHs and 3 clients, this is only an example and the numbers of RHs and clients may be different in an actual wireless network deployment.

As described in more detail hereinafter in connection with FIG. 1, each RH includes multiple antennas, a downconverter for each antenna, an upconverter for each antenna, an automatic gain control circuitry/functionality. As a result, each RH can generate multiple receive signals, one detected by each antenna, associated with a transmission made by a client device.

With the central MAC/PHY processor subsystem and distributed RHs, the ability to receive all of a frame that collides (overlaps in time) with another frame is greatly improved due to physical separation of the RHs and the large variation in path loss that results. The RHs serve only to detect the start of a frame e.g., an 802.11 physical layer convergence procedure (PLCP) protocol data unit (PPDU), perform automatic gain control (AGC) to the signal, and downconvert the received signal to baseband (or other intermediate frequency) to produce fixed-point in-phase/quadrature (I/Q) samples. The I/Q samples associated with each signal detected by each antenna of a RH are sent over a fronthaul network to the central MAC/PHY processor subsystem 10. In addition, RHs share a clock and are RF synchronized. The combination of the central MAC/PHY processor subsystem 20 and the plurality of RHs 30(1)-30(N) form a distributed multi-user-MIMO system when communicating with multiple client devices simultaneously, as described further hereinafter.

Figure 2:
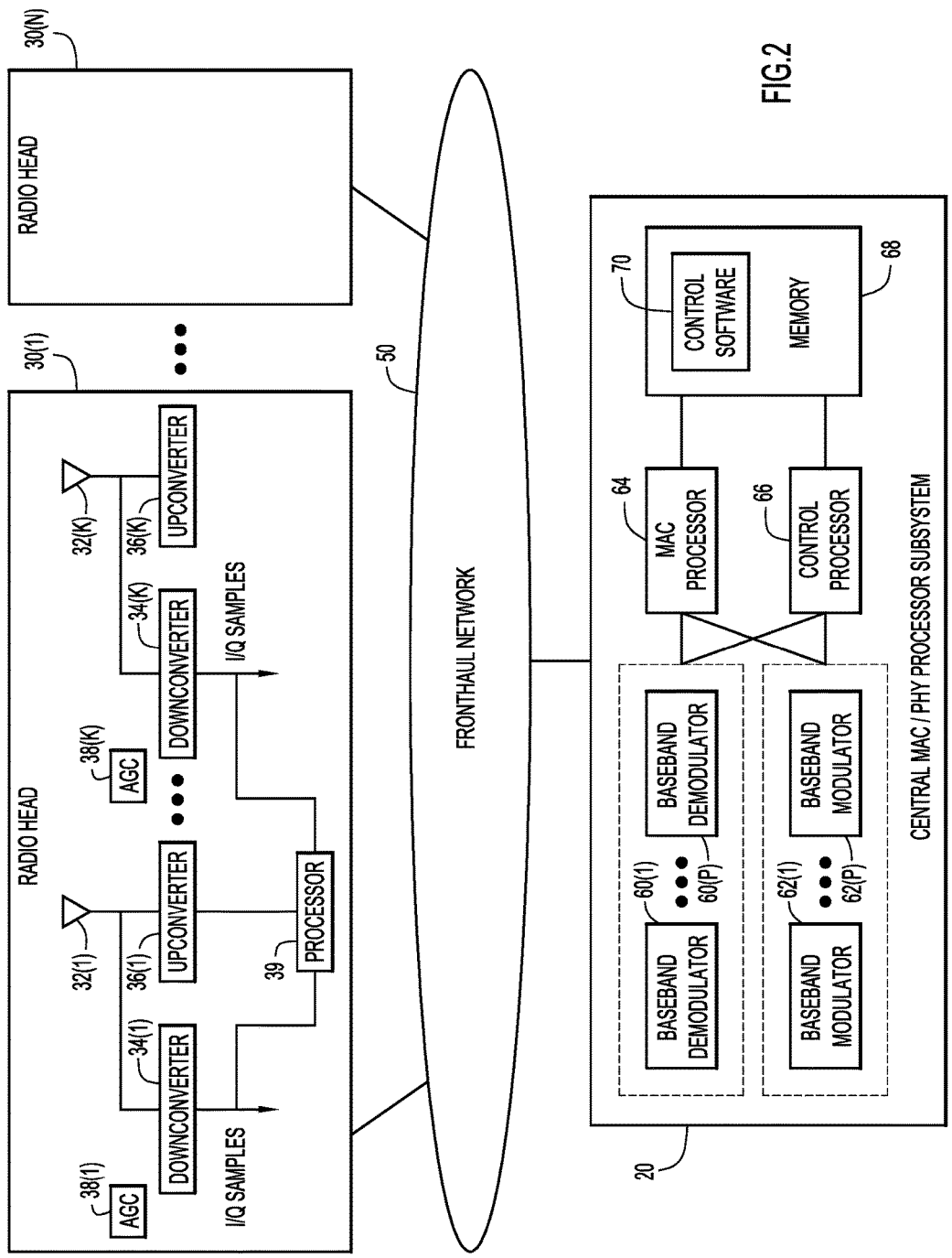
FIG. 2 is a more detailed block diagram of the system shown in FIG. 1, according to an example embodiment.

Reference is now made to FIG. 2. FIG. 2 shows the RHs and the central MAC/PHY processor subsystem in more detail, according to an example embodiment. For generality, a plurality of RHs 30(1)-30(N) is shown connected to the central MAC/PHY processor subsystem 20 by a fronthaul network 50.

Each RH includes a plurality of antennas 32(1)-32(K), a corresponding plurality of downconverters 34(1)-34(K), a corresponding plurality of upconverters 36(1)-36(K) and a corresponding plurality of AGC blocks 38(1)-38(K) (or one AGC block shared across all of the antenna paths). Each downconverter 34(1)-34(K) generates downconverted I/Q samples of a signal received at its associated antenna, which are sent over the fronthaul network 50 to the central MAC/PHY processor subsystem 20. Each upconverter 36(1)-36(K) upconverts I/Q transmit signals (received from the central MAC/PHY processor subsystem 20) for transmission via its associated antenna. An analog-to-digital converter (ADC) may be included in or associated with each downconverter 34(1)-34(K), though not shown in FIG. 2 for simplicity. Likewise, a digital-to-analog converter (DAC) may be included in or associated with each upconverter 36(1)-36(K).

In addition, each RH may include a processor 39 that is coupled to each of the downconverters 34(1)-34(K) to perform signal processing on the downconverted samples produced by the downconverters. The processor 39 may be a digital signal processor, an application specific integrated circuit (ASIC) including digital logic gates, a programmable digital logic, or a microprocessor or microcontroller that executes instructions stored in memory to carry out various signal processing operations.

The central MAC/PHY processor subsystem 20 includes a bank of baseband demodulators 60(1)-60(P), a bank of baseband modulators 62(1)-62(P), a MAC processor 64, a control processor 66, and memory 68. The MAC processor 64 and control processor 66 are each connected to the bank of baseband demodulators 60(1)-60(P) and to the bank of baseband modulators 62(1)-62(P). The baseband demodulators 60(1)-60(P) perform baseband demodulation processing on the downconverted I/Q samples received from each antenna path of each RH. The baseband modulators 62(1)-62(P) perform baseband modulation processing to generate I/Q transmit signals to be supplied to each upconverter of each antenna path of each RH. The MAC processor 64 performs media access control processing. The control processor 66 performs a variety of other functions, including the centralized stomp-and-restart processing described in greater detail below, by executing instructions associated with the control software 70 stored in memory 68. In one form, one or more of the baseband demodulators, baseband modulators, MAC processor 64 and control processor 66 may be implemented in one or more ASICs, digital signal processors, programmable digital logic gates, etc.

The memory 68 may include read only memory (ROM), random access memory (RAM), magnetic disk storage media devices, optical storage media devices, flash memory devices, electrical, optical, or other physical/tangible memory storage devices. Thus, in general, the memory 68 may comprise one or more tangible (non-transitory) computer readable storage media (e.g., a memory device) encoded with software comprising computer executable instructions and when the software is executed (by the processor 65) it is operable to perform the operations described herein.

Referring now to FIG. 3A, with continued reference to FIG. 1, the RHs may detect a frame from each client with the characteristics shown in FIG. 3A, as an example. FIG. 3A shows a table listing per RH/per client receive signal strength information, wherein the entries with horizontal cross-hatches are the highest receive signal strength information (RSSI) and the entries with the vertical cross-hatches indicates very high signal-to-interference ratio (SIR) for those client/RH(s). FIG. 3B shows overall SIR for each client's best RH, by SIR.

As is evident from FIGS. 3A and 3B, from the diversity of path losses between different RHs and client combinations, there are good opportunities for enough SIR in order to detect start-of-packet and recover the PPDUs for different clients. Even for clients that are nearby each other, there can be enough of an RSSI difference between clients detected at the same RH due to different client antenna patterns, and that will have the same general effect as being separated. For example, in the case of certain smartphone devices, the RF signal emitted from the back of the device is 10+dB stronger than the signal out of the front of the device. Therefore, the benefit to separated RHs can be used for co-located clients as well as separated clients in many circumstances.

Figure 4:
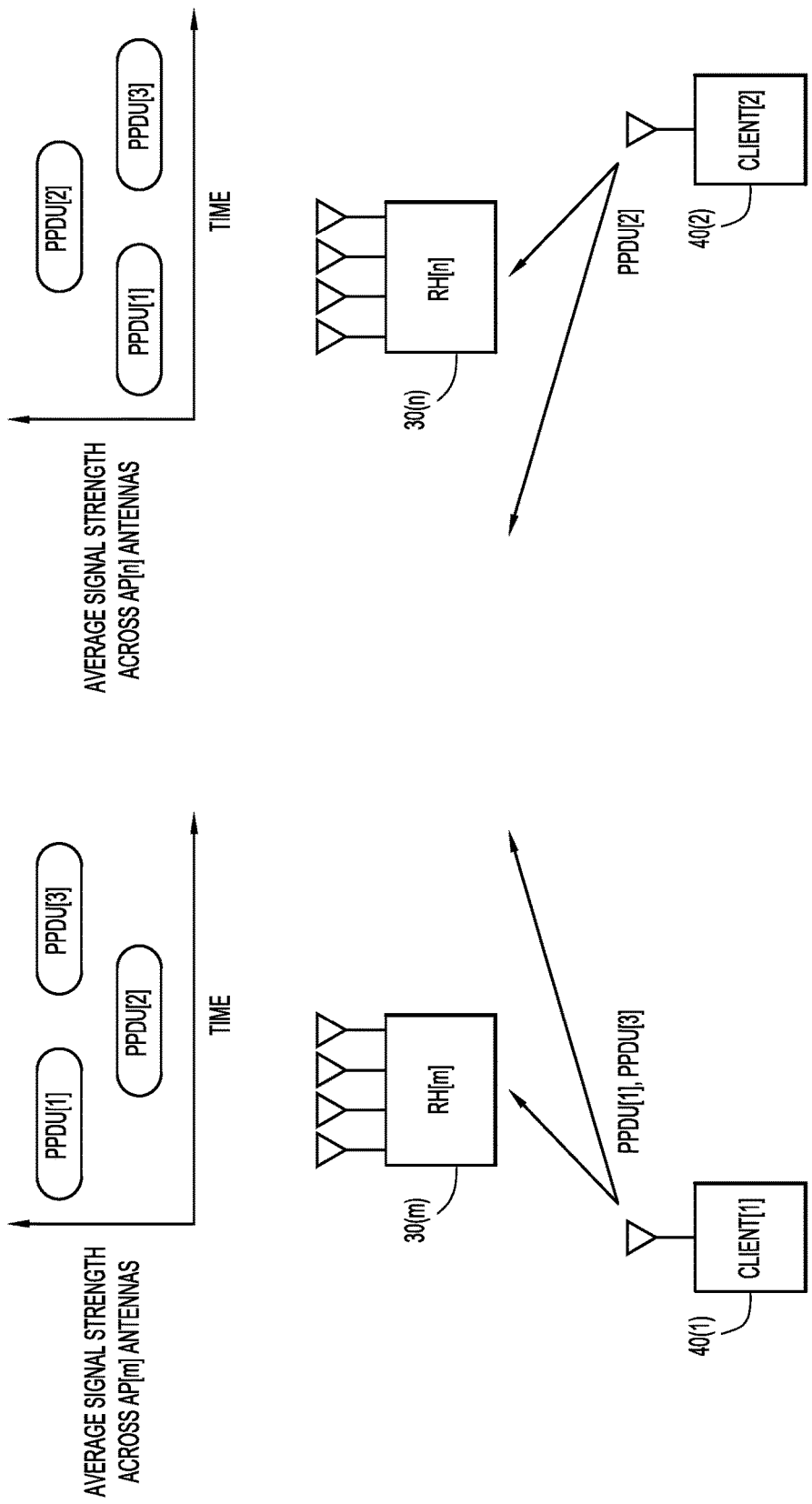
FIG. 4 is a diagram depicting an example of a situation in which the stomp-and-restart techniques presented herein may be employed, according to an example embodiment.

Reference is now made to FIG. 4 that illustrates an example scenario in which the stomp-and-restart techniques presented herein may be employed. When Client[1] at 40(1) transmits PPDU[1], which is detected by multiple RHs (e.g., RHs denoted RH(m) and RH(n) at reference numerals 30(m) and 30(n), respectively), the central MAC/PHY processor subsystem 22 groups RH antennas into subsets for parallel decoding of PPDU[1]. The central MAC/PHY processor subsystem 22 could use all available RHs in a single decode process. However, in the event of the collision with PPDU[2], that single decode process would need to restart on PPDU[2] or continue on PPDU[1], and consequently at most only one PPDU would be recovered from the collision. By splitting the decoding into parallel processes, flexible use of resources for detecting and recovering both PPDUs in the collision is possible.

Partitioning Antennas into Decoding Subsets

Reference is continued to be made to FIGS. 1, 2 and 4. Each RH forms a default starting subset of antennas. For the purpose of this description, a radio head is a logical partitioning of antennas, where each part could coexist in a single mechanical enclosure, in close proximity to be considered as a group, or all parts could be enclosed in a single mechanical enclosure. It is a predetermined configuration of the system. Each RH is capable of performing common actions such as start-of-packet (SOP) detection, automatic gain control (AGC), etc. That is, each RH, by way of operations performed by the processor 39 in each RH, may perform SOP detection and the AGC block(s) in each RH may performed AGC operations, or these operations are performed by the central MAC/PHY processor subsystem 22 acting on the group of signals designated as a single RH.

Figure 5:
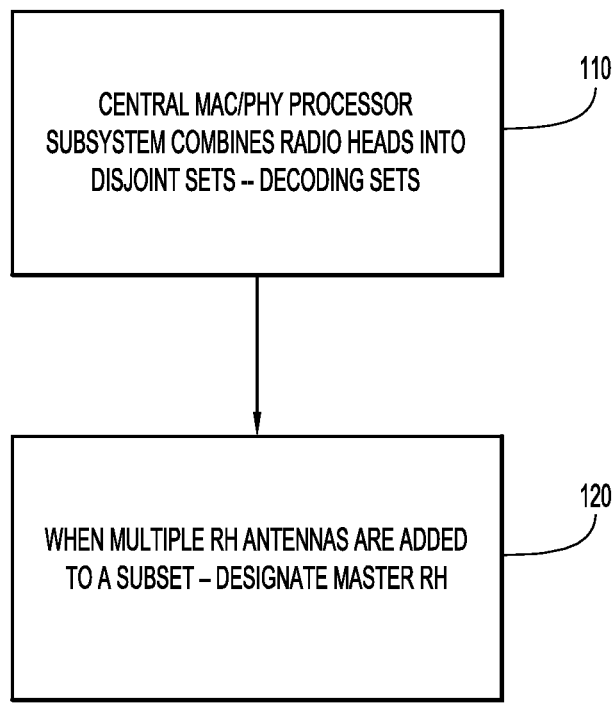
FIG. 5 is a flow chart depicting a process for grouping radio head devices, shown in FIG. 1, into disjoint sets, according to an example embodiment.

According to the techniques presented herein, a process 100 is provided for partitioning antennas into decoding subsets is now described with reference to the flow chart of FIG. 5. After start-of-packet detection by N radio heads, at 110, the central MAC/PHY processor subsystem 20 combines radio heads into disjoint sets called decoding sets or decoding clusters. Each decoding set contains a sufficient number of antennas to satisfy the maximum number of expected spatial streams in a single PPDU (Nant≥Nss). These sets may be formed by ordering the radio heads according to RSSI measurements or signal-to-interference-plus-noise (SINR) measurements and cutting off at Nant, or some other partitioning mechanism.

Usually in an AP with multiple receive paths the timing (symbol timing) is common to all receive paths. The sample indices corresponding to a symbol are the same across all receive paths. When multiple radio heads are used in a set, then symbol alignment should be decided common to all paths.

The radio heads are assumed to be synchronized with their reference oscillators locked to a common source. In this case, any one of the radio heads could provide carrier frequency offset (CFO) estimation and corrections made to that estimate. If the radio heads are not locked, which is possible, then the individual radio heads each have a CFO estimate and correction unique to the respective radio head.

At 120, when multiple RH antennas are added to a subset, the notion of a master RH may be introduced. Collapsing two RHs (or two subsets of RHs) into a single subset is simplified if one RH is the master.

The master RH may be used for CFO estimation. Digital AGC may be made to the level of the master RH. In addition, timing and resampling is performed with respect to the master RH. The use of a master RH is, however, optional.

Partitioning the antennas may be made based on certain heuristics, including RSSI (seek common RSSI), channel condition per subset (mean across subcarriers), and optimal size of decoding subsets. A minimum size may be required to ensure successful decoding (with forward error correction greater than some threshold) plus collision margin loss of signal-noise-ratio. Collision margin can be a system parameter based on deployment density/type.

Distributed Stomp-and-Restart Operation

Figure 6:
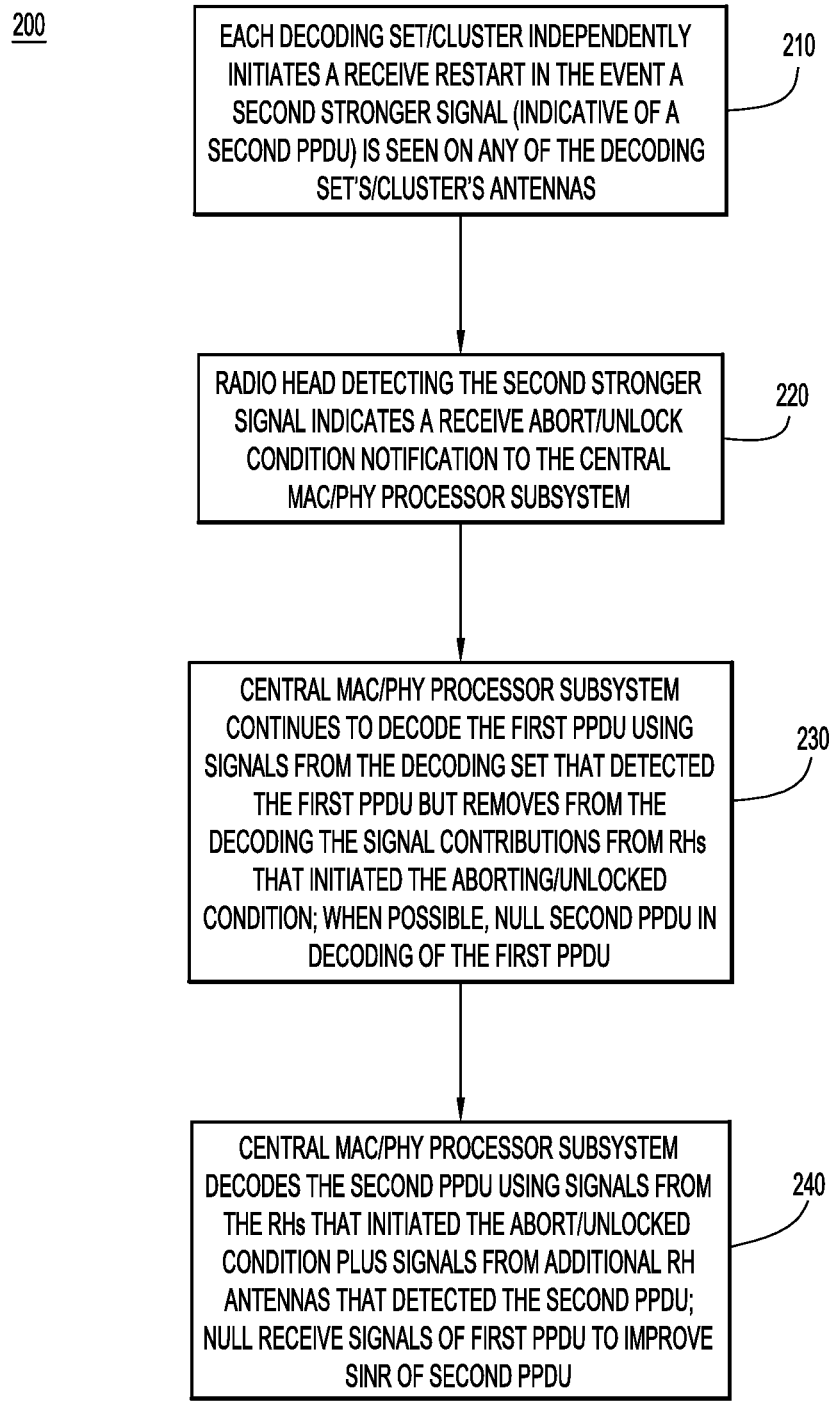
FIG. 6 is a flow chart depicting a process for stomp-and-restart techniques in a distributed MU-MIMO system, according to an example embodiment.

Reference is now made to FIG. 6 for a description of a flowchart depicting operations for a distributed stomp-and-restart process 200. The situation described in connection with process 200 is one in which, while a first signal (e.g., first packet or first PPDU) is being received (from one of the client devices) and decoded by the central MAC/PHY processor subsystem, a second signal (e.g., second packet or second PPDU) is also received and the second packet may have a stronger receive signal strength. The central MAC/PHY processor subsystem decodes the first packet using downconverted samples received by an arbitrary first decoding set of RHs. At 210, each decoding set independently initiates and sends a receive restart notification (issued by the SOP function running on the processor of a RH) to the central MAC/PHY processor subsystem in the event a second stronger signal is detected on any of the decoding set's/cluster's antennas while a first signal is being received. The receive restart notification serves to alert the central MAC/PHY processor subsystem that a stronger second packet is being received by a particular set of RHs while the first packet is being decoded. The detection of a second stronger signal could indicate that a second PPDU is being received, in collision with a first signal (first PPDU). At 220, a RH in a decoding set detecting a stronger second signal (RSSI change greater than a threshold) sends a receive abort/AGC unlock condition notification to the central MAC/PHY processor subsystem 20.

The central MAC/PHY processor subsystem 20 attempts to continue to decode both the first PPDU and second PPDU using two decoding sets. Specifically, at 230, the central MAC/PHY processor subsystem 20 decodes the original PPDU using signals from the decoding set that detected the original PPDU but removes from the decoding the signal contributions from RHs that initiated the aborting/unlocked condition. Said another way, the central MAC/PHY processor subsystem 20 continues to decode the first packet using downconverted samples from the first decoding set of radio head devices but without downconverted samples from the particular set of radio head devices associated with the stronger second packet. When possible, the central MAC/PHY processor subsystem 20 nulls the signal contributions associated with the new PPDU when decoding the original PPDU. That is, the MAC/PHY processor subsystem 20 nulls downconverted samples associated with the second packet when decoding the first packet.

At 240, the central MAC/PHY processor subsystem 20 decodes the second PPDU using signals from RHs that initiated the aborting/unlocked condition, and in addition signals from any RH antennas that detected the second PPDU, where such additional signals from RH antennas are selected according to RSSI or SINR. Said another way, the central MAC/PHY processor subsystem 20 decodes the second packet using downconverted samples from radio head devices in the particular set of radio head devices and using downconverted samples from any one or more additional antennas of a radio head device that detected the second packet. The receive signals associated with the first PPDU may be nulled when decoding the second PPDU to improve SINR of the new PPDU.

In some cases, too few antennas would be available, or the SINR would be too poor, in which case the central MAC/PHY processor subsystem 20 aborts processing on unrecoverable PPDUs.

Receiver Stomp-and-Restart in a Distributed MU-MIMO System Using Nulling

This embodiment attempts solves the same problem but with more signal processing that can recover collided PPDUs even without much RSSI separation.

A subset of RHs detect and start processing a first PPDU (e.g. PPDU[1]). Once the channel estimation portion of the PPDU is complete, the RHs involved in receiving the first PPDU also generate/synthesize spatial nulling data associated with the first PPDU, and supply the spatial nulling data the central MAC/PHY processor subsystem for use in nulling the first PPDU when decoding the second PPDU. In this way, if a second PPDU is transmitted, it can be detected and decoded at the central MAC/PHY processor subsystem with a relatively high SINR.

However, since the second PPDU may not be symbol aligned or CFO aligned with the first PPDU, spatial filtering in the frequency domain (after a Fast Fourier Transform (FFT)) may not be effective due to inter-carrier interference (ICI) and inter-symbol interference (ISI). Therefore, in one embodiment, time domain nulling is more general (nRx× nRx matrix multiplication). However, the channel may vary across the frequency band, so time domain nulling can only null the mean channel, and may only deliver 5 or 10 dB SINR in many typical channels.

At the opposite extreme, the sequence of (CFO correction+FFT+spatial nulling per subcarrier+IFFT)+CFO re-application provides much more precise nulling, but has high latency since the FFT/IFFT has 64 points for a 20 MHz IEEE 802.11 signal, and 128, 256 and 612 points for 40, 80 and 160 MHz wide signals, respectively.

Thus, the spatial nulling data may be for use in nulling the first packet in the frequency domain or for nulling the first packet in the time domain.

A further embodiment balances nulling quality with latency is to use CFO correction+4point-FFT+spatial nulling per subcarrier+4point-IFFT+CFO re-application where the 4point FFT splits a 20 MHz band into 5 MHz subbands that can be individually nulled using the average MIMO channel across the 5 MHz. By using a 2, 4, 8 or 16 orthogonalizing reversible transform, reasonable nulling quality at tolerable latencies can be achieved.

Figure 7:
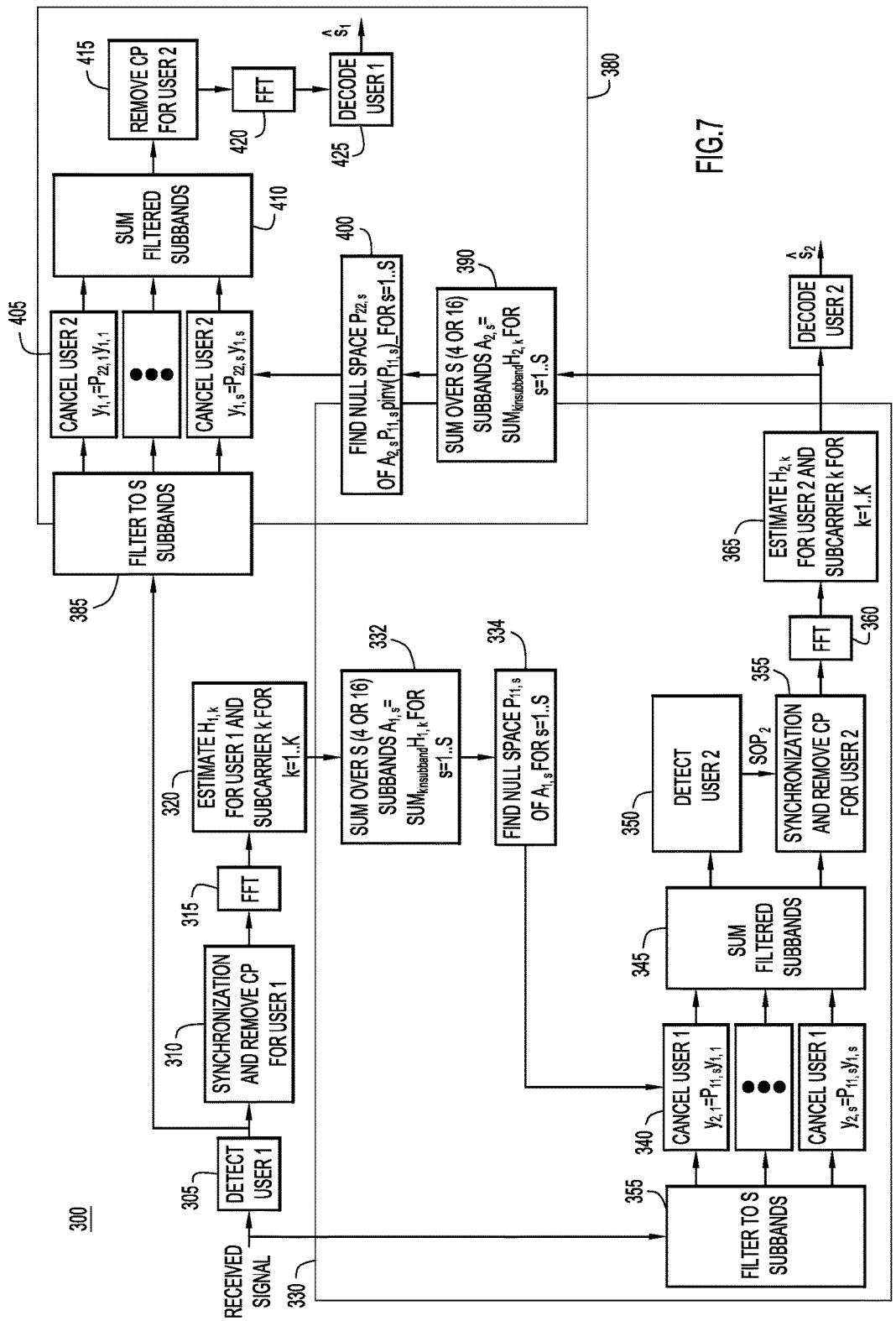
FIG. 7 is a flow diagram that illustrates signal processing according to another example embodiment.

FIG. 7 illustrates a processing flow 300 for a more specific example of this further embodiment. The process 300 is performed by the central MAC/PHY processing subsystem 20. A receive signal is obtained and at 305, a packet is detected from a first user (e.g., first client device) denoted User 1, and at the same time a packet may be detected from a second user (e.g., a second client device) denoted User 2. At 310, synchronization is performed and the cyclic prefix (CP) is removed from User 1, At 315, an ITT is performed. At 320, a channel estimation $H_{1,k}$ is made for User 1 at subcarrier k for K subcarriers.

There are two signal processing paths 330 and 380. Processing path 330 is based on the output of operation 305 to decode the packet for User 1, and processing path 380 is performed based on the output of operation 320 to decode the packet for User 1. Channel information generated at 320 is supplied to processing path 330. Channel information generated by processing path 330 is supplied to processing path 380 as described herein.

Describing processing path 330 first, at 332, a sum is made over S subbands (4 or 16) of the channel estimate $H_{1,k}$ to produce $A_{1,s}=\text{sum}_{kinSubband}H_{1,k}$ for s=1, . . . S. At 334, the null space $P_{11,s}$ for signal contributions associated with the packet from User 1 is computed from $A_{1,s}$ for s=1, . . . S. At 335, the received signal is filtered to S subbands using the received signal and the null space $P_{11,s}$. At 340, signal contributions associated with User 1 in the S subbands are canceled in each of the S subbands by the operations $y_{2,1}=P_{11,1}y_{1,1}, \ldots, y_{2,S}=P_{11,S}y_{1,S}$. At 345, a sum is computed across the filtered subbands. At 350, an attempt is made to detect the packet of User 2 such that the output of step 250 is start-of-packet (SOP) detection indicating of the packet of User 2, denoted $SOP_2$. At 355, synchronization is performed and the CP is removed from. User 2. At 360, an FFT is performed (e.g., a relatively small number of points such as 4 points). At 365, the channel $H_{2,k}$ for User 2 is estimated at subcarriers k. The output of step 365 is supplied to both the decode operation 370 and to the processing path 380. At 370, the packet for User 2 is decoded to output $\hat{s}_2$.

The processing path 380 is now described. At 385, the output of step 305 is filtered to S subbands. At 390, a sum is made over S subbands (4 or 16) of the channel estimate $H_{2,k}$ to produce $A_{2,s}=\text{sum}_{kinSubband}H_{2,k}$ for s=1, . . . S. At 400, the null space $P_{22,s}$ for signal contributions associated with the packet from User 2 is computed from $A_{2,s}$ for s=1, . . . S. At 405, using the output from operation 400 and the output of operation 385, signal contributions associated with User 2 are canceled in each of the S subbands by the operations $y_{1,1}=P_{22,1}y_{1,1}, \ldots, y_{1,S}=P_{22,S}y_{1,S}$. At 410, a sum is computed across the filtered subbands. At 415, the CP is removed from User 1. At 420, an FFT is computed (similar to operation 360 described above) and at 425, the packet from User 1 is decoded to output $\hat{s}_1$.

Figure 8:
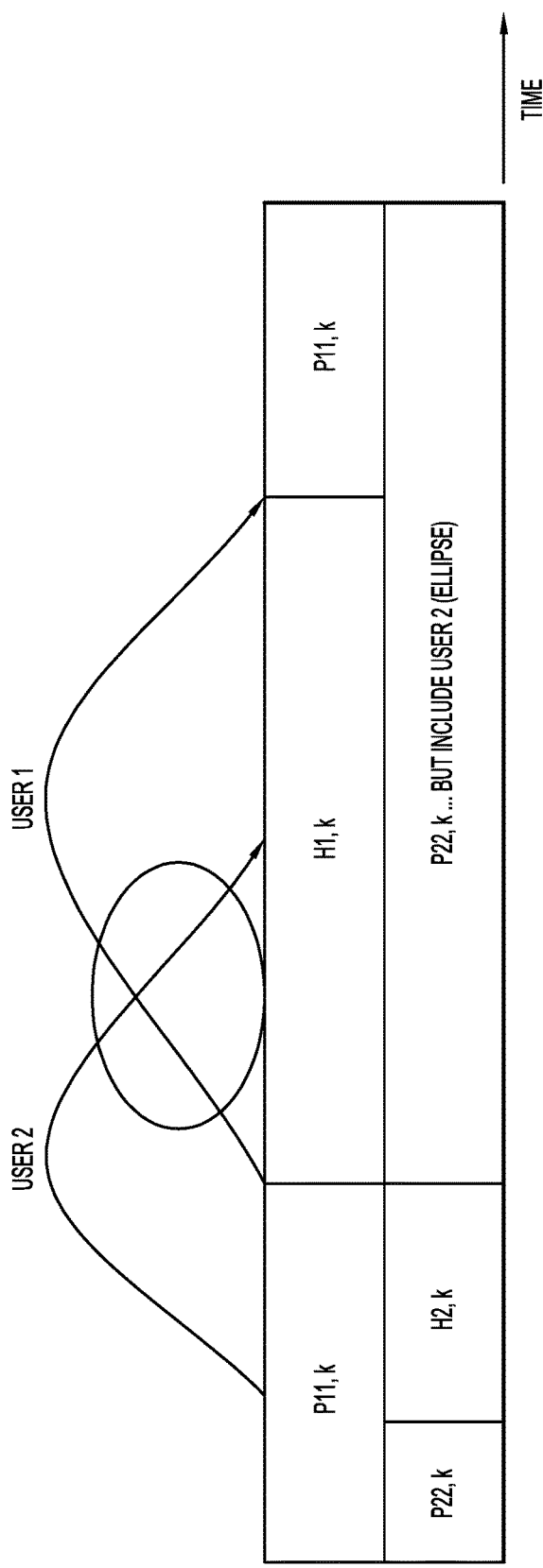
FIG. 8 is a diagram illustrating the relationship between null space information computed in the signal processing flow of FIG. 7, according to an example embodiment.

Reference is now made to FIG. 8. FIG. 8 illustrates the null space information $P_{11,k}$ and $P_{22,k}$ computed from the channel estimates $H_{1,k}$ and $H_{2,k}$ for overlapping packets from two client devices denoted User 1 and User 2.

In performing the process 300 shown in FIG. 7, the central MAC/PHY processor subsystem 20 is configured to process the spatial nulling data to compensate for carrier frequency offset of the first packet with respect to the second packet using carrier frequency offset correction, a Fast Fourier Transform, or a general Digital Fourier Transform, estimation of spatial nulling per subband comprised of one or more subcarriers, and a filter bank using coefficients based on Digital Fourier Transform coefficients, wherein the filter bank splits a frequency channel into constituent subbands that are individually nulled.

In summary, in one form, a system is provided comprising: a plurality of receiver devices configured to be deployed separated from each other in a coverage region of interest of a wireless network, each receiver device including a plurality of antennas and a downconverter associated with each antenna configured to downconvert received signals transmitted by two or more client devices, each downconverter configured to produce downconverted samples of the received signals at each of the plurality of antennas; and a central processor subsystem in communication with the plurality receiver devices, the central processor subsystem configured to: receive the downconverted samples from the plurality of receiver devices; after start-of-packet detection of a first packet by one or more of the plurality of receiver devices based on the downconverted samples, group receiver devices into disjoint sets based on measurements related to signal strength or signal-to-interference of the downconverted samples associated with the first packet; decode the first packet using downconverted samples received by a first set of receiver devices; determine that a stronger second packet is being received by a particular set of receiver devices while the first packet is being decoded when the stronger second packet is detected on any antenna of the particular set of receiver devices; continue to decode the first packet using downconverted samples from the first set of receiver devices but without downconverted samples from the particular set of radio receiver associated with the stronger second packet; and decode the second packet using downconverted samples from receiver devices in the particular set of receiver devices and using downconverted samples from any one or more additional antennas of a receiver device that detected the second packet.

In another form, a method is provided comprising: receiving transmitted signals from two or more client devices at a plurality of receiver devices separated from each other in a coverage region of interest of a wireless network, each receiver device including a plurality of antennas; producing downconverted samples of received signals at each of the plurality of antennas of each receiver device; performing start-of-packet detection of a first packet by one or more of the plurality of receiver devices based on the downconverted samples; after start-of-packet detection of the first packet, grouping receiver devices into disjoint sets based on measurements related to signal strength or signal-to-interference of the downconverted samples associated with the first packet; decoding the first packet using downconverted samples received by a first set of receiver devices; determining that a stronger second packet is being received by a particular set of receiver devices while the first packet is being decoded when the stronger second packet is detected on any antenna of the particular set of receiver devices; continuing to decode the first packet using downconverted samples from the first set of receiver devices but without downconverted samples from the particular set of receiver devices associated with the stronger second packet; and decoding the second packet using downconverted samples from receiver devices in the particular set of receiver devices and using downconverted samples from any one or more additional antennas of a receiver device that detected the second packet.

In still another form, one or more non-transitory computer readable storage media encoded with instructions that, when executed by a processor, cause the processor to perform operations comprising: performing start-of-packet detection of a first packet received by one or more of a plurality of receiver devices based on downconverted samples generated by one or more of the plurality of receiver devices from transmit signals received from two or more client devices in a wireless network, the plurality of receiver devices being separated from each other in a coverage region of interest of the wireless network, each receiver device including a plurality of antennas; after start-of-packet detection of the first packet, grouping receiver devices into disjoint sets based on measurements related to signal strength or signal-to-interference of the downconverted samples associated with the first packet; decoding the first packet using downconverted samples received by a first set of receiver devices; determining that a stronger second packet is being received by a particular set of receiver devices while the first packet is being decoded when the stronger second packet is detected on any antenna of the particular set of receiver devices; continuing to decode the first packet using downconverted samples from the first set of receiver devices but without downconverted samples from the particular set of receiver devices associated with the stronger second packet; and decoding the second packet using downconverted samples from receiver devices in the particular set of receiver devices and using downconverted samples from any one or more additional antennas of a receiver device that detected the second packet.

In still another form, an apparatus is provided comprising a processor and a network interface unit configured to enable communications over a network to communicate with a plurality of receiver devices configured to be deployed separated from each other in a coverage region of interest of a wireless network, each receiver device including a plurality of antennas and a downconverter associated with each antenna configured to downconvert received signals transmitted by two or more client devices, each downconverter configured to produce downconverted samples of the received signals at each of the plurality of antennas. The processor is configured to: perform start-of-packet detection of a first packet received by one or more of a plurality of receiver devices based on downconverted samples generated by one or more of the plurality of receiver devices from transmit signals received from two or more client devices in a wireless network, the plurality of receiver devices being separated from each other in a coverage region of interest of the wireless network, each receiver device including a plurality of antennas; after start-of-packet detection of the first packet, group receiver devices into disjoint sets based on measurements related to signal strength or signal-to-interference of the downconverted samples associated with the first packet; decode the first packet using downconverted samples received by a first set of receiver devices; determine that a stronger second packet is being received by a particular set of receiver devices while the first packet is being decoded when the stronger second packet is detected on any antenna of the particular set of receiver devices; continue to decode the first packet using downconverted samples from the first set of receiver devices but without downconverted samples from the particular set of receiver devices associated with the stronger second packet; and decode the second packet using downconverted samples from receiver devices in the particular set of receiver devices and using downconverted samples from any one or more additional antennas of a receiver device that detected the second packet.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A system comprising:
a plurality of receiver devices configured to be deployed separated from each other in a coverage region of interest of a wireless network, each receiver device including a plurality of antennas and a downconverter associated with each antenna configured to downconvert received signals transmitted by two or more client devices, each downconverter configured to produce downconverted samples of the received signals at each of the plurality of antennas; and
a central processor subsystem in communication with the plurality receiver devices, the central processor subsystem configured to:
receive the downconverted samples from the plurality of receiver devices;
after start-of-packet detection of a first packet by one or more of the plurality of receiver devices based on the downconverted samples, group receiver devices into disjoint sets based on measurements related to signal strength or signal-to-interference ratio of the downconverted samples associated with the first packet;
decode the first packet using downconverted samples received by a first set of receiver devices;
determine that a stronger second packet is being received by a particular set of receiver devices while the first packet is being decoded when the stronger second packet is detected on any antenna of the particular set of receiver devices;
continue to decode the first packet using downconverted samples from the first set of receiver devices but without downconverted samples from the particular set of receiver devices associated with the stronger second packet; and
decode the second packet using downconverted samples from receiver devices in the particular set of receiver devices and using downconverted samples from any one or more additional antennas of a receiver device that detected the second packet.

2. The system of claim 1, wherein the central processor subsystem is configured to group the receiver devices such that each decoding set has a sufficient number of antennas to process a maximum number of expected spatial streams in a single packet unit transmitted by one or more of the client devices.

3. The system of claim 2, wherein the central processor subsystem is configured to, in grouping the receiver devices, order the receiver devices according to receive signal strength or signal-to-interference ratio of downconverted samples obtained from the respective receiver devices.

4. The system of claim 1, wherein the central processor subsystem is configured to determine that the stronger second packet is being received based on a receive restart indication sent by a receiver device in the particular set of receiver devices.

5. The system of claim 1, wherein one or more receiver devices that detect the second packet with a receive signal strength greater than a threshold are configured to send a receive abort/unlock condition notification to the central processor subsystem.

6. The system of claim 5, wherein the central processor subsystem is configured to decode the second packet using downconverted samples from the one or more receiver devices that sent the receive abort/unlock condition notification.

7. The system of claim 1, wherein the central processor subsystem is configured to null downconverted samples associated with the second packet when decoding the first packet.

8. The system of claim 1, wherein the central processor subsystem is configured to select downconverted samples for the one or more additional antennas based on receive signal strength or signal-to-interference ratio.

9. The system of claim 1, wherein the central processor subsystem is configured to null downconverted samples associated with the first packet when decoding the second packet.

10. The system of claim 1, wherein the receiver devices in the first set of receiver devices are configured to generate spatial nulling data associated with the first packet and to supply the spatial nulling data to the central processor subsystem for use in nulling the first packet when decoding the second packet.

11. The system of claim 10, wherein the spatial nulling data is for use in nulling the first packet in a frequency domain, or for nulling the first packet in a time domain.

12. The system of claim 10, wherein the central processor subsystem is configured to further process the spatial nulling data to compensate for carrier frequency offset of the first packet with respect to the second packet using carrier frequency offset correction, a Fast Fourier Transform, or a general Digital Fourier Transform, estimation of spatial nulling per subband comprised of one or more subcarriers, and a filter bank using coefficients based on Digital Fourier Transform coefficients, wherein the filter bank splits a frequency channel into constituent subbands that are individually nulled.

13. A method comprising:
receiving transmitted signals from two or more client devices at a plurality of receiver devices separated from each other in a coverage region of interest of a wireless network, each receiver device including a plurality of antennas;
producing downconverted samples of received signals at each of the plurality of antennas of each receiver device;
performing start-of-packet detection of a first packet by one or more of the plurality of receiver devices based on the downconverted samples;
after start-of-packet detection of the first packet, grouping receiver devices into disjoint sets based on measurements related to signal strength or signal-to-interference ratio of the downconverted samples associated with the first packet;
decoding the first packet using downconverted samples received by a first set of receiver devices;
determining that a stronger second packet is being received by a particular set of receiver devices while the first packet is being decoded when the stronger second packet is detected on any antenna of the particular set of receiver devices;
continuing to decode the first packet using downconverted samples from the first set of receiver devices but without downconverted samples from the particular set of receiver devices associated with the stronger second packet; and
decoding the second packet using downconverted samples from receiver devices in the particular set of receiver devices and using downconverted samples from any one or more additional antennas of a receiver device that detected the second packet.

14. The method of claim 13, wherein determining that the stronger second packet is being received is based on a receive restart indication sent by a receiver device in the particular set of receiver devices.

15. The method of claim 14, further comprising the one or more receiver devices that detect the second packet with a receive signal strength greater than a threshold are configured to generate a receive abort/unlock condition notification.

16. The method of claim 15, wherein decoding the second packet comprises decoding the second packet using downconverted samples from the one or more receiver devices that generated the receive abort/unlock condition notification.

17. The method of claim 13, further comprising nulling downconverted samples associated with the second packet when decoding the first packet, and nulling downconverted samples associated with the first packet when decoding the second packet.

18. One or more non-transitory computer readable storage media encoded with instructions that, when executed by a processor, cause the processor to perform operations comprising:
performing start-of-packet detection of a first packet received by one or more of a plurality of receiver devices based on downconverted samples generated by one or more of the plurality of receiver devices from transmit signals received from two or more client devices in a wireless network, the plurality of receiver devices being separated from each other in a coverage region of interest of the wireless network, each receiver device including a plurality of antennas;
after start-of-packet detection of the first packet, grouping receiver devices into disjoint sets based on measurements related to signal strength or signal-to-interference ratio of the downconverted samples associated with the first packet;
decoding the first packet using downconverted samples received by a first set of receiver devices;
determining that a stronger second packet is being received by a particular set of receiver devices while the first packet is being decoded when the stronger second packet is detected on any antenna of the particular set of receiver devices;
continuing to decode the first packet using downconverted samples from the first set of receiver devices but without downconverted samples from the particular set of receiver devices associated with the stronger second packet; and decoding the second packet using downconverted samples from receiver devices in the particular set of receiver devices and using downconverted samples from any one or more additional antennas of a receiver device that detected the second packet.

19. The non-transitory computer readable storage media of claim 18, wherein the instructions for determining that the stronger second packet is being received is based on a receive restart indication sent by a receiver device in the particular set of receiver devices.

20. The non-transitory computer readable storage media of claim 18, wherein the instructions for decoding the second packet comprise instructions for decoding the second packet using downconverted samples from the one or more receiver devices that sent a receive abort/unlock condition notification indicating that the one or more receiver devices detected the second packet with a receive signal strength greater than a threshold.

* * * * *